(12) United States Patent
Iwata

(10) Patent No.: US 6,199,005 B1
(45) Date of Patent: Mar. 6, 2001

(54) VEHICLE DRIVE FORCE CONTROL DEVICE

(75) Inventor: Toru Iwata, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/066,816

(22) Filed: Apr. 28, 1998

(30) Foreign Application Priority Data

Apr. 28, 1997 (JP) .................................... 9-111093
Apr. 28, 1997 (JP) .................................... 9-111094

(51) Int. Cl.$^7$ ................................ G06F 7/00; B60T 7/12
(52) U.S. Cl. .............................. 701/87; 701/84; 701/90; 701/95; 701/53; 701/54; 477/43; 477/46; 477/48; 180/197; 303/140; 303/146
(58) Field of Search .................................. 701/71, 74, 82, 701/83, 84, 85, 86, 87, 90, 51, 53, 54, 95; 187/197, 233, 248; 290/40 R, 40 A, 40 B, 40 C, 40 D; 477/175, 93, 47, 161, 97, 169, 46, 48, 138, 43; 303/141, 171, 146, 115.4, 116.2, 113.2, 140, 143

(56) References Cited

U.S. PATENT DOCUMENTS

| | | | |
|---|---|---|---|
| 4,720,793 | * | 1/1988 | Watanabe et al. .................. 701/60 |
| 4,796,718 | * | 1/1989 | Thielen et al. ..................... 180/197 |
| 4,884,653 | * | 12/1989 | Kouno ................................. 701/69 |
| 5,069,086 |   | 12/1991 | Murano et al. ...................... 74/866 |
| 5,091,857 | * | 2/1992 | Katayama et al. ................. 701/112 |
| 5,320,422 | * | 6/1994 | Tsuyama et al. .................... 701/84 |
| 5,435,795 |   | 7/1995 | Mochizuki et al. ................. 477/39 |
| 5,474,505 |   | 12/1995 | Seidel et al. ....................... 477/49 |
| 5,734,595 | * | 3/1998 | Matsuno ............................. 701/86 |
| 5,826,209 | * | 10/1998 | Matsuno ............................. 701/69 |
| 5,829,544 | * | 11/1998 | Ishizu ................................ 180/197 |
| 5,852,330 | * | 12/1998 | Yumoto ............................. 290/40 R |
| 5,957,991 | * | 9/1999 | Yasuda ................................ 701/84 |

FOREIGN PATENT DOCUMENTS

| | | |
|---|---|---|
| 0 530 381 | 3/1993 | (EP) . |
| 2 204 368 | 11/1988 | (GB) . |
| 4-50440 | 2/1992 | (JP) . |

OTHER PUBLICATIONS

Takashi; "Engine Control Method for Vehicle Equipped with CVT System"; Patents Abstracts of Japan; vol. 016, No. 239; Jun. 2, 1992, & JP 04 050440; Feb. 19, 1992; Abstract.

* cited by examiner

Primary Examiner—Jacques H. Louis-Jacques
(74) Attorney, Agent, or Firm—Foley & Lardner (57) ABSTRACT

A slip of drive wheels of a vehicle driven via a continuously variable transmission is suppressed due to fuel cut of a multi-cylinder engine. The speed change response characteristics of the transmission are made to vary according to the engine rotation speed when fuel cut is performed. A speed change ratio command value is calculated from a target speed change ratio based on a first-order delay due to a predetermined time-constant. The response of the transmission is thus delayed for low engine rotation speed than for high rotation speed, and undesirable fluctuation of the speed change ratio when the drive wheels slip is prevented.

20 Claims, 11 Drawing Sheets

WHEN ENGINE ROTATION SPEED IS LOW

RTO VARIATION IS SENSITIVE TO SLIP FACTOR

FIG.4C

WHEN ENGINE ROTATION SPEED IS HIGH

RTO VARIATION IS LESS SENSITIVE TO SLIP FACTOR

VEHICLE DRIVE FORCE CONTROL DEVICE

The contents of Tokugan Hei 9-111093 and 9-111094, with a filing date of Apr. 28, 1997 in Japan, are hereby incorporated by reference.

FIELD OF THE INVENTION

This invention relates to a drive force controller for preventing slipping of a drive wheel of a vehicle comprising a continuously variable transmission.

BACKGROUND OF THE INVENTION

A drive force control system or traction control system which prevents a drive wheel from slipping during acceleration of a vehicle and prevents the decline of acceleration performance, suppresses wheel slip for example by decreasing an engine output according to the slip of the drive wheels.

The decrease of engine output may be realized for example by closing a second throttle which is provided in parallel with an intake throttle, by stopping fuel injection to a specific cylinder of the engine, or by retarding the fuel ignition timing of the engine.

Tokkai Hei 4-50440 published by the Japanese Patent Office in 1992 discloses the application of a drive force controller which cuts fuel supply to some cylinders of the engine when drive wheels are slipping, to a vehicle comprising a continuously variable transmission (CVT).

In the CVT, a real speed change ratio is found for example from the ratio of the output shaft rotation speed and the input shaft rotation speed of CVT, and speed change control is performed so that the real speed change ratio coincides with a target speed change ratio which is set according to a running state.

However, since the CVT attempts to decrease the speed change ratio when the engine output torque is decreased due to fuel cut, but the response of the CVT is somewhat slower than that of drive force reduction by fuel cut, a hunting, i.e., fluctuation, of the speed change ratio is apt to occur, and the torque transmitted to the drive wheels may also fluctuate. This torque fluctuation causes vibration of the vehicle body.

For example, during acceleration after vehicle startup, the rotation speed of the drive wheels increases suddenly if the drive wheels slip. The output of the engine is therefore correspondingly reduced by performing fuel cut, the drive wheel speed decreases, and the slip converges. The target speed change ratio of the CVT also varies largely relative to the sudden change of drive wheel speed during this time, but as the response of the CVT is lower than that of the engine output variation due to fuel cut, hunting easily occurs while the drive wheel speed is rapidly varying.

Further, although drive force control due to fuel cut is highly responsive, the control resolution is low, and in an engine with a small number of cylinders, the engine output largely varies due to the fuel cut in one cylinder. Therefore, a variation of drive force easily becomes excessive due to fuel cut operation.

SUMMARY OF THE INVENTION

It is therefore an object of this invention to suppress fluctuation of speed change ratio when a CVT is associated with a fuel cut system of a drive force controller.

In order to achieve the above object, this invention provides a vehicle drive force controller for suppressing a slip of a drive wheel of a vehicle driven by a multi-cylinder engine via a continuously variable transmission. The controller comprises a sensor for detecting a slip of the drive wheel, a drive force reducing mechanism for reducing a drive force of the drive wheel, a sensor for detecting a running state of the vehicle, a sensor for detecting a load of the engine, and a microprocessor.

The microprocessor is programmed to calculate a target speed change ratio according to the running state, output to the transmission, a speed change ratio command signal to control a speed change ratio of the transmission to the target speed change ratio, control the drive force reducing mechanism so as to reduce the drive force of the drive wheel when the slip of the drive wheel was detected, control the drive force reducing mechanism so as to further reduce the drive force of the drive wheel when the slip of the drive wheel was detected, when the engine load is larger than a predetermined load than when the engine load is equal to or less than the predetermined load, and modify the speed change ratio command signal so as to reduce a torque transmitted by the transmission is reduced when the engine load is equal to or less than the predetermined load than when the engine load is larger than the predetermined value.

It is preferable that the microprocessor is further programmed to modify the speed change ratio command signal so as to reduce the torque by increasing a response of the transmission.

It is also preferable that the microprocessor is further programmed to control the drive force reducing mechanism so as to further reduce the drive force by decreasing an output of the engine.

It is also preferable that the load detecting sensor detects a rotation speed of the engine when the slip of the drive wheel has been detected.

It is also preferable that the microprocessor is further programmed to prevent the drive force reducing mechanism from reducing the drive force when the engine load is equal to or less than the predetermined load.

It is also preferable that the drive force reducing mechanism comprises fuel injection valves respectively injecting fuel to cylinders of the engine, and the microprocessor is further programmed to control the drive force reducing mechanism so as to reduce the drive force by stopping fuel injection by one of the fuel injection valves.

This invention also provides a vehicle drive force controller comprising a sensor for detecting a slip of the drive wheel, a drive force reducing mechanism for reducing a drive force of the drive wheel, a sensor or detecting a running state of the vehicle, a sensor for detecting a rotation speed of the engine and a microprocessor programmed to calculate a target speed change ratio according to the running state, output to the transmission a speed change ratio command signal to control a speed change ratio of the transmission to the target speed change ratio, control the drive force reducing mechanism so as to reduce the drive force of the drive wheel when the slip of the drive wheel was detected, set the command signal such that a response of the transmission is delayed with respect to a variation of the running state, determine whether or not a rotation speed of the engine is equal to or less than a predetermined value, and modify the command signal such that the response of the transmission when the rotation speed is equal to or less than the predetermined value, is higher than when the rotation speed is larger than the predetermined value.

It is preferable that the drive force reducing mechanism comprises fuel injection valves respectively injecting fuel to cylinders of the engine, and the microprocessor is further programmed to stop fuel injection by one of the fuel injection valves when the slip of the drive wheel is detected.

It is further preferable that the microprocessor is further programmed to set a maximum number of fuel injection valves to be prevented from injecting fuel when the rotation speed of the engine exceeds the predetermined value, to be larger than the maximum number of fuel injection valves to be prevented from injecting fuel when the rotation speed of the engine is equal to or less than the predetermined value.

It is still further preferable that the microprocessor is further programmed to control the fuel injection valves such that a predetermined number of the fuel injection valves is not prevented from injecting fuel when the rotation speed of the engine is equal to or less than a predetermined value.

It is also preferable that the microprocessor is further programmed to determine the target speed change ratio based on the running state of the vehicle, calculate the speed change ratio command value such that the speed change ratio of the transmission follows the target speed change ratio with a predetermined time-constant, and increase the response of the transmission by reducing the time-constant when the rotation speed of the engine is equal to or less than the predetermined value.

It is further preferable that the microprocessor is further programmed to set the time-constant when the rotation speed of the engine exceeds the predetermined value, equal to the time-constant when the slip of the drive wheel is not detected.

This invention also provides a vehicle drive force controller for suppressing a slip of a drive wheel of a vehicle driven by a multi-cylinder engine via a continuously variable transmission, comprising a sensor for detecting a slip of the drive wheel, a drive force reducing mechanism for reducing a drive force of the drive wheel, a sensor for detecting a running state of the vehicle, and a microprocessor The microprocessor is programmed to calculate a target speed change ratio according to the running state, output to the transmission, a speed change ratio command signal to control a speed change ratio of the transmission to the target speed change ratio, control the drive force reducing mechanism so as to reduce the drive force of the drive wheel when the slip of the drive wheel is detected, determine whether or not a predetermined time has elapsed since the slip of the drive wheel was detected, and modify the command signal such that a response of the transmission is delayed with respect to a variation of the running state until the predetermined time has elapsed.

It is preferable that the drive force reducing mechanism comprises fuel injection valves respectively injecting fuel to cylinders of the engine, and the microprocessor is further programmed to stop fuel injection by one of the fuel injection valves when the slip of the drive wheel was detected.

It is also preferable that the microprocessor is further programmed to set a virtual vehicle speed which follows the vehicle speed with a first order delay based on a predetermined time constant, and modify the command signal by calculating the target speed change ratio based on the virtual vehicle speed.

It is also preferable that the microprocessor comprises plural different maps for calculating the target speed change ratio according to the vehicle speed, and is further programmed to modify the command signal by applying different maps depending on whether or not the predetermined time has elapsed.

It is also preferable that the drive wheel slip detecting sensor comprises a sensor for detecting a rotation speed of a drive wheel and a sensor for detecting a rotation speed of a driven wheel, and the microprocessor is further programmed to calculate a slip factor of the drive wheel, from a ratio of the rotation speed of the drive wheel and the driven wheel, and determine that the predetermined time has not elapsed from when the slip of the drive wheel was detected when the slip factor is greater than a predetermined factor.

It is further preferable that the microprocessor is further programmed to calculate a variation amount of the slip factor of the drive wheel, and determine that the predetermined time has not elapsed from when the slip of the drive wheel was detected when the slip factor is greater than the predetermined factor and the variation amount is greater than a predetermined amount.

The details as well as other features and advantages of this invention are set forth in the remainder of the specification and are shown in the accompanying drawings.

DESCRIPTION OF THE PREFERRED EMBODIMENTS

Figure 1:
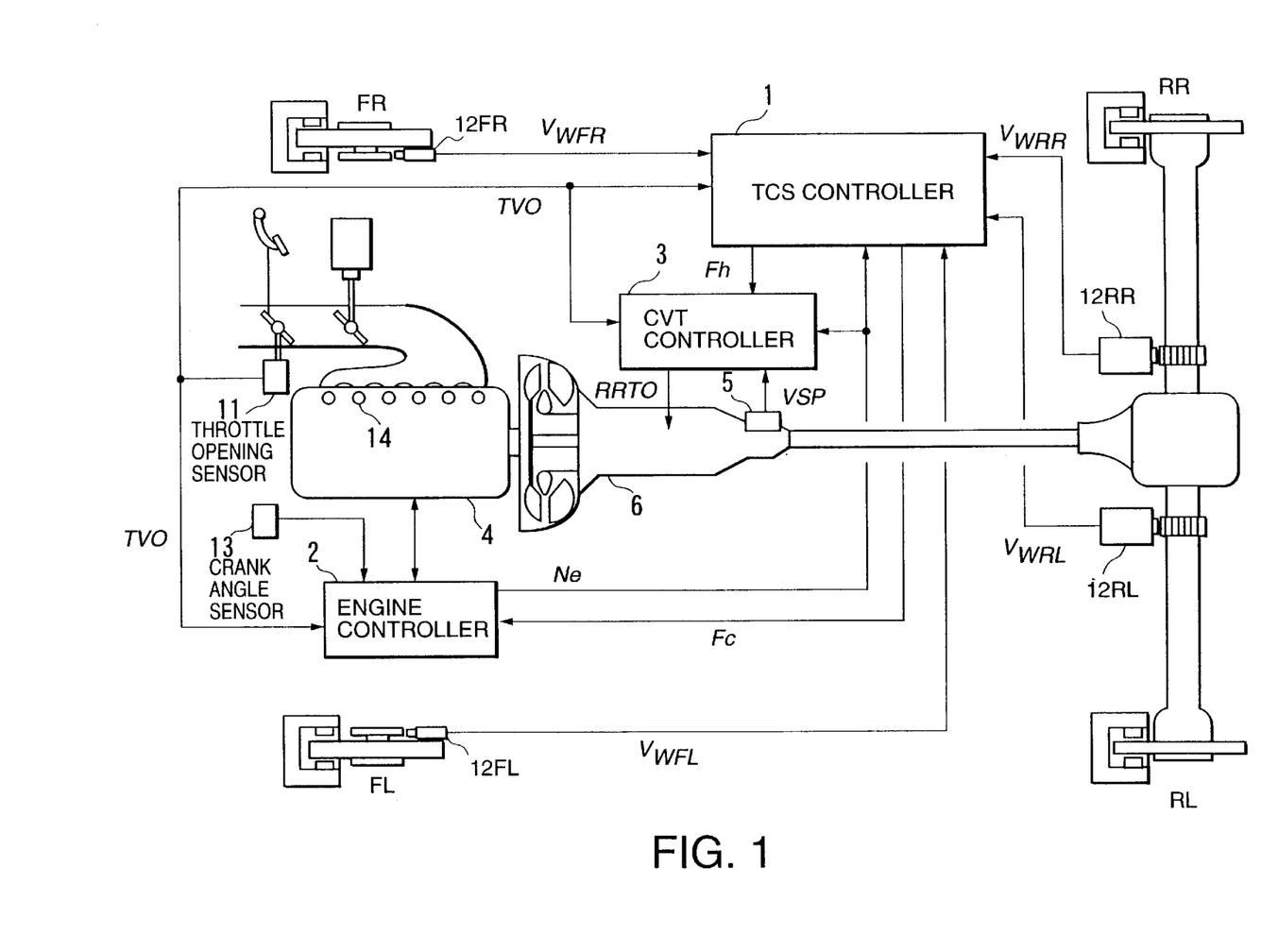
FIG. 1 is a schematic diagram of a drive force controller according to this invention.

Referring to FIG. 1 of the drawings, a multi-cylinder engine 4 drives rear wheels RR, RL of a vehicle via a continuously variable transmission (CVT) 6.

The engine 4 is rotated by burning fuel injected into each cylinder from a fuel injection valve 14, and torque is thereby supplied to the CVT 6. A fuel injection amount and injected fuel ignition timing are controlled by an engine controller 2. For this purpose, an engine rotation speed Ne from a crank angle sensor 13 and a throttle opening TVO of the engine 4 from a throttle opening sensor 11 are respectively input to the engine controller 2. In the normal running state, the engine controller 2 controls fuel injection to the engine 4 based on the throttle opening TVO, which varies according to a depression amount of the accelerator pedal operated by a driver and the engine rotation speed Ne.

Speed change control of the CVT 6 is performed by a CVT controller 3. The CVT 6 is connected to the rear wheels RR, RL which are the drive wheels of the vehicle. A signal from a vehicle speed sensor 5 for detecting a vehicle speed VSP and the above-mentioned throttle sensor 11 are respectively input into the CVT controller 3. The CVT controller 3 looks up a prestored speed change map according to these signals, and determines a target speed change ratio RTO. The CVT 6 is controlled so that a real speed change ratio of the CVT 6 coincides with the target speed change ratio RTO.

It should be noted that the vehicle speed sensor 5 detects a rotation speed of an output shaft of the CVT 6, so when the drive wheels RR, RL slip, the vehicle speed VSP appears to increase.

The engine controller 2 and CVT controller 3 respectively vary the number of fuel injection cylinders of the engine 4 and a first-order delay constant Kr of speed change control, according to the input of a signal from the TCS controller 1.

Wheel speed signals $V_{WFR}$, $V_{WFL}$, $V_{WRR}$, $V_{WRL}$ from wheel speed sensors 12FR, 12FL, 12RR 12RL for detecting wheel rotation speeds or wheel axle rotation speeds are respectively input into the TCS controller 1. The wheel speed sensors 12FR, 12FL detect the speed of front wheels FR, FL and the wheel speed sensors 12RR, 12RL detect the speed of rear wheels RR, RL. In this vehicle, the front wheels FR, FL are driven wheels to which drive force is not transmitted. The TCS controller 1 detects slipping of the drive wheel RR or RL based on a comparison of the speed of drive wheels with that of driven wheels. When the drive wheels RR and RL slip, the TCS controller 1 outputs a fuel cut signal Fc to the engine controller 2, and a drive force control command signal Fh to the CVT controller 3.

The engine controller 2 reduces the output of the engine 4 according to the fuel cut signal by stopping fuel supply to a corresponding cylinder or cylinders of the engine 4 as in the case of the aforesaid prior art example.

The CVT controller 3 modifies the first order delay time-constant Kr so as to control the response characteristics of the CVT 6 relative to the drive force control command signal Fh. The first order delay time-constant Kr is a control constant to make the real speed change ratio coincide with the target speed change ratio at a desired response.

Figure 2:
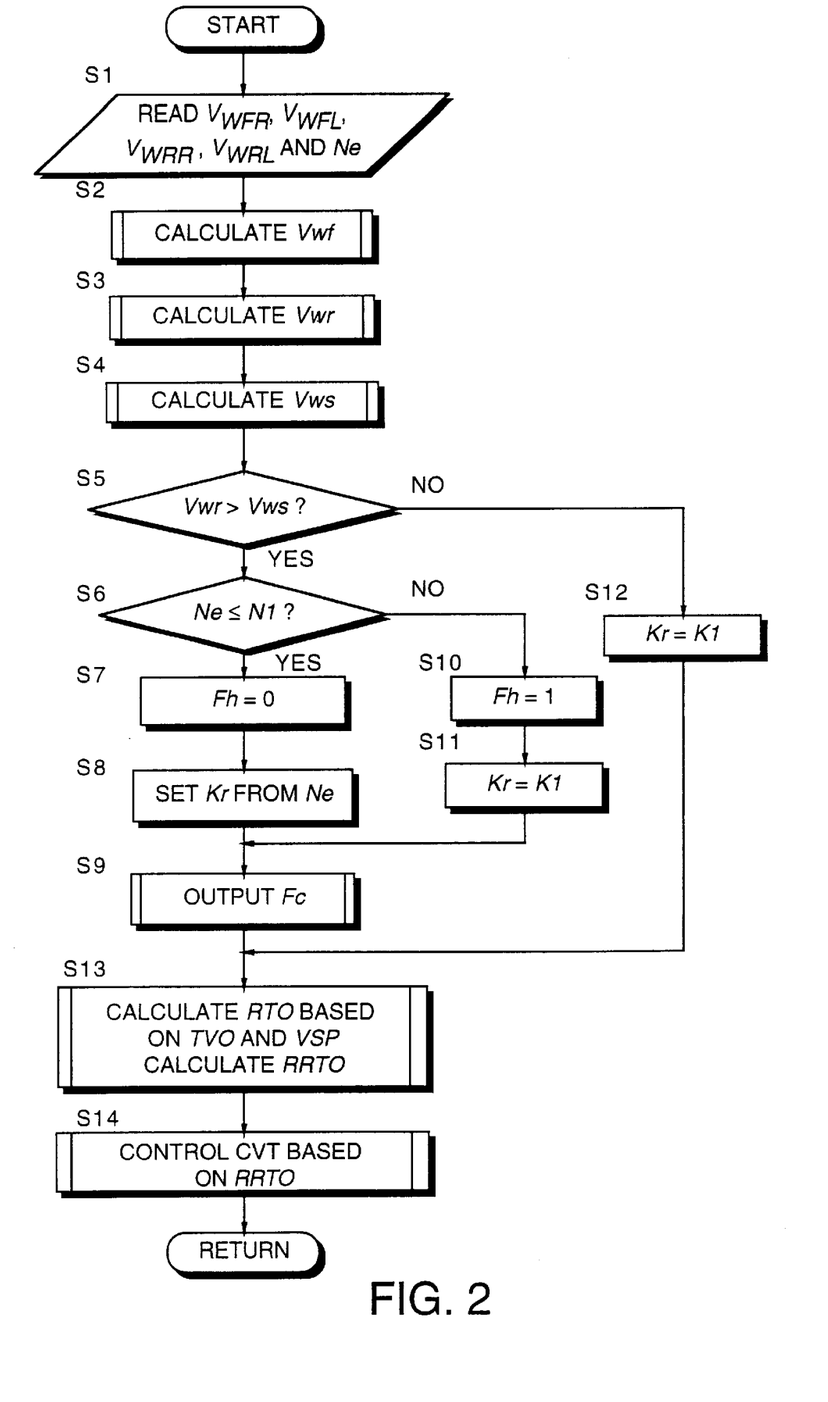
FIG. 2 is a flowchart for describing a drive force control process performed by a TCS controller and CVT controller with which the drive force controller is equipped.

Next, the drive force control and speed change control process performed by the TCS controller 1 and CVT controller 3 will be described referring to the flowchart of FIG. 2. This process is executed at a fixed interval, e.g., 10 milliseconds.

Steps S1–S7, S9 and S10 show the processing performed by the TCS controller 1, and steps S8 and S11–S14 show the processing performed by the CVT controller 3.

In a step S1, the TCS controller 1 finds the speeds $V_{WFR}$, $V_{WFL}$, $V_{WRR}$, $V_{WRL}$ of the wheels from signals from the wheel speed sensors 12FR–12RL. The rotation speed Ne of the engine 4 is read from the output signal of engine controller 2.

In a step S2, an average speed Vwf of the driven wheels is calculated by averaging the wheel speeds $V_{WFR}$ and $V_{WFL}$.

An average speed Vwr of the drive wheels is calculated in a step S3 by averaging the wheel speeds $V_{WRR}$ and $V_{WRL}$.

In a step S4, a target value Vws of drive wheel speed which is the target value of drive force control is found by adding a predetermined value α to the average driven wheel speed Vwf representing the current vehicle speed, as shown by the following equation (1).

$$Vws=Vwf+\alpha \quad (1)$$

For example, the predetermined value α is set to 2–5 km/hr.

In a step S5, it is determined whether or not the average drive wheel speed Vwr exceeds the target drive wheel speed Vws. When the average drive wheel speed Vwr exceeds the target drive wheel speed Vws, it is determined that the drive wheels have slipped, and the routine proceeds to a step S6. When the average drive wheel speed Vwr is equal to or less than the target drive wheel speed Vws, it is determined that the vehicle is running normally, and the routine proceeds to a step S12.

In the step S6, the engine rotation speed Ne is compared with a predetermined value N1. When the engine rotation speed Ne is equal to or less than the predetermined value N1, the TCS controller 1 sets the drive force control command signal Fh to 0 in a step S7, and outputs it to the CVT controller 3.

In a step S8, the first-order delay time-constant Kr which the CVT controller 3 applies to speed change control is calculated based on the input of the drive force control command signal Fh=0. This is found by looking up a map in FIG. 3 based on the engine rotation speed Ne.

On the other hand, when the engine rotation speed Ne exceeds the predetermined value N1 in the step S6, the TCS controller 1 sets the drive force control command signal Fh to 1 in a step S10, and this is output to the CVT controller 3.

In a step S11, the first-order delay time-constant Kr which the CVT controller 3 applies to speed change control is fixed to a predetermined value K1 based on the input of the drive force control command signal Fh=1.

Figure 3:
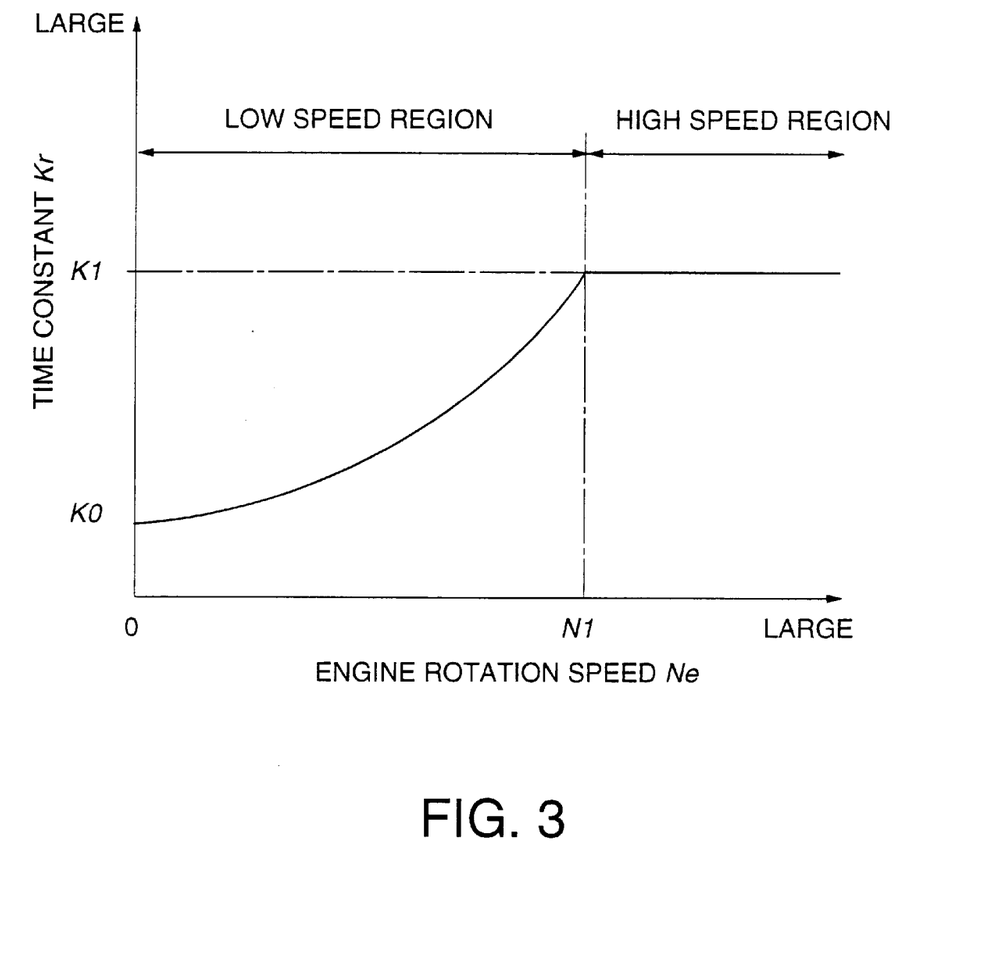
FIG. 3 is a map describing a relation between a first-order delay time-constant Kr and an engine rotation speed Ne according to this invention.

A map of the first order delay time-constant Kr of FIG. 3 is preset according to the vehicle characteristics, and is prestored by the CVT controller 3. In this map, in the low rotation speed region when the engine rotation speed Ne is equal to or less than the predetermined value N1, the time-constant Kr is set to increase gradually to the predetermined value K1 from a predetermined value K0 (K0<K1) as the engine rotation speed Ne increases toward N1 from 0.

After the CVT controller 3 sets the drive force control command signal Fh and time-constant Kr according to the engine rotation speed Ne in this way, the TCS controller 1 outputs the fuel cut signal Fc based on the drive force control command signal Fh to the engine controller 2 in a step S9.

Figure 4A:
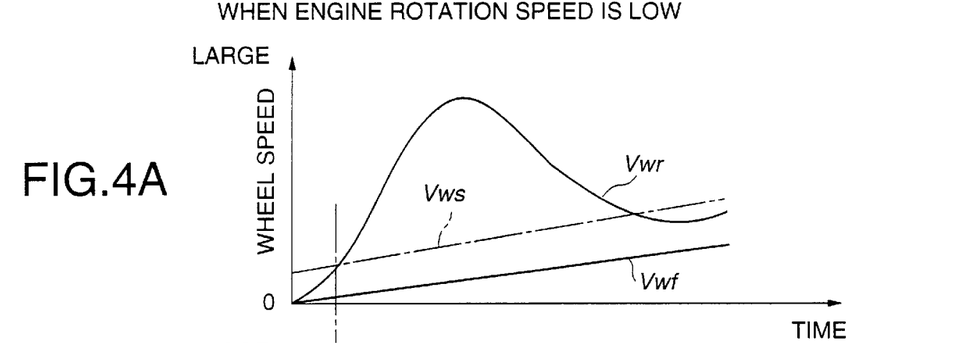
FIGS. 4A–4C are timing charts describing the characteristics of drive force control relative to the slip of a drive wheel in a low rotation speed region of the engine.
Figure 4B:
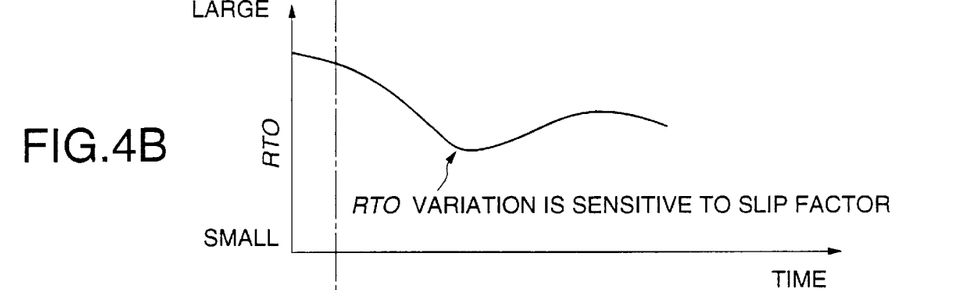
Figure 4C:
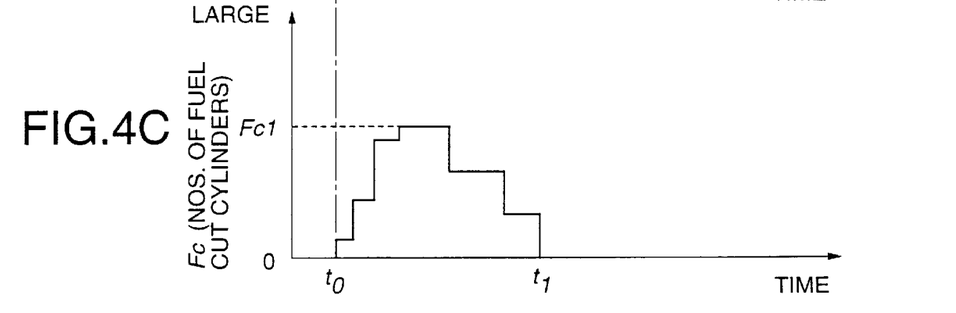
Figure 5A:
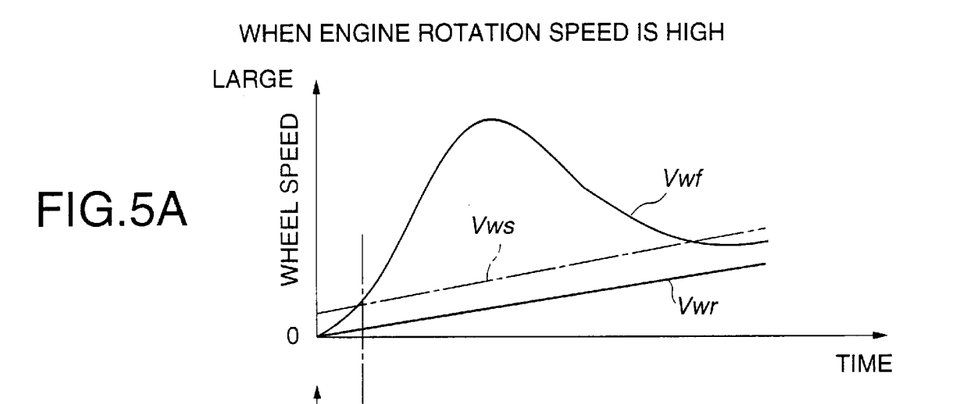
FIGS. 5A–5C are timing charts describing the characteristics of drive force control relative to the slip of the drive wheel in a high rotation speed region of the engine.
Figure 5B:
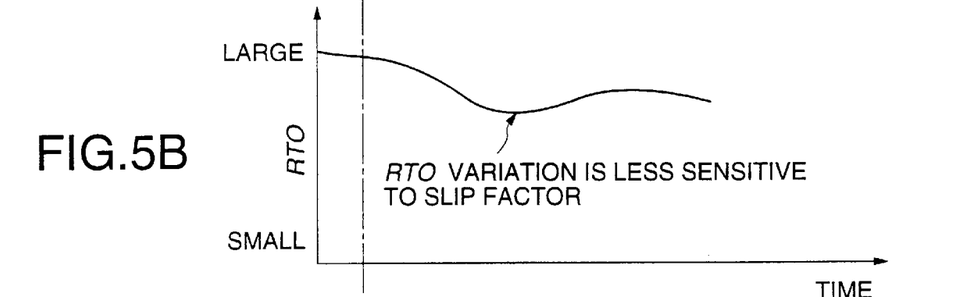
Figure 5C:
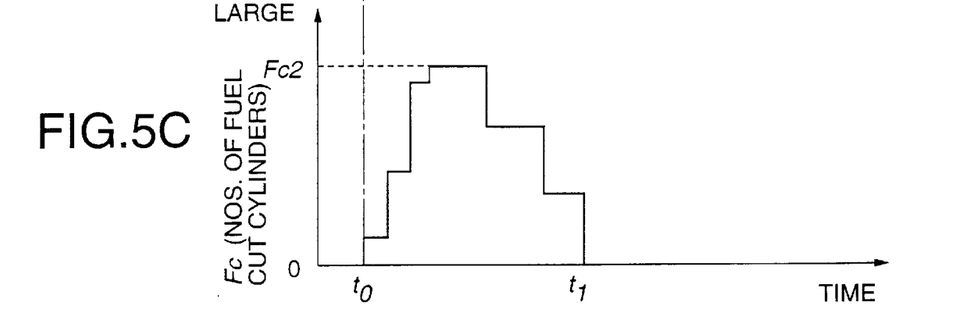

When the drive force control command signal Fh=0, i.e. when the engine 4 is in the low rotation speed region, the maximum value of the fuel cut amount is set to Fc1 as shown in FIG. 4C. When Fh=1, i.e. when the engine 4 is in the high rotation speed region, the maximum value of the fuel cut amount is set to Fc2 which is larger than Fc1 as shown in FIG. 5C.

The TCS controller 1 determines the fuel cut amount according to a slip factor S of the drive wheels subject to these maxima, and outputs the corresponding fuel cut signal Fc to the engine controller 2.

The slip factor S is represented by S=Vwr/Vwf. The TCS controller 1 increases the fuel cut amount Fc the larger the slip factor S, and the slip of the drive wheels is suppressed by reducing the output of the engine 4 via the engine controller 2.

After the TCS controller 1 outputs the fuel cut signal Fc in the step S9, the CVT controller 3 computes the target speed change ratio RTO in a step S13.

On the other hand, when the drive wheel average speed Vwr is equal to or less than the target drive wheel speed Vws in the step S5, the CVT controller 3 sets the first-order delay time-constant Kr to the predetermined value K1 in a step S12. In this case, output of the fuel cut signal Fc by the TCS controller 1 is not performed, and the process proceeds to the step S13.

Figure 7:
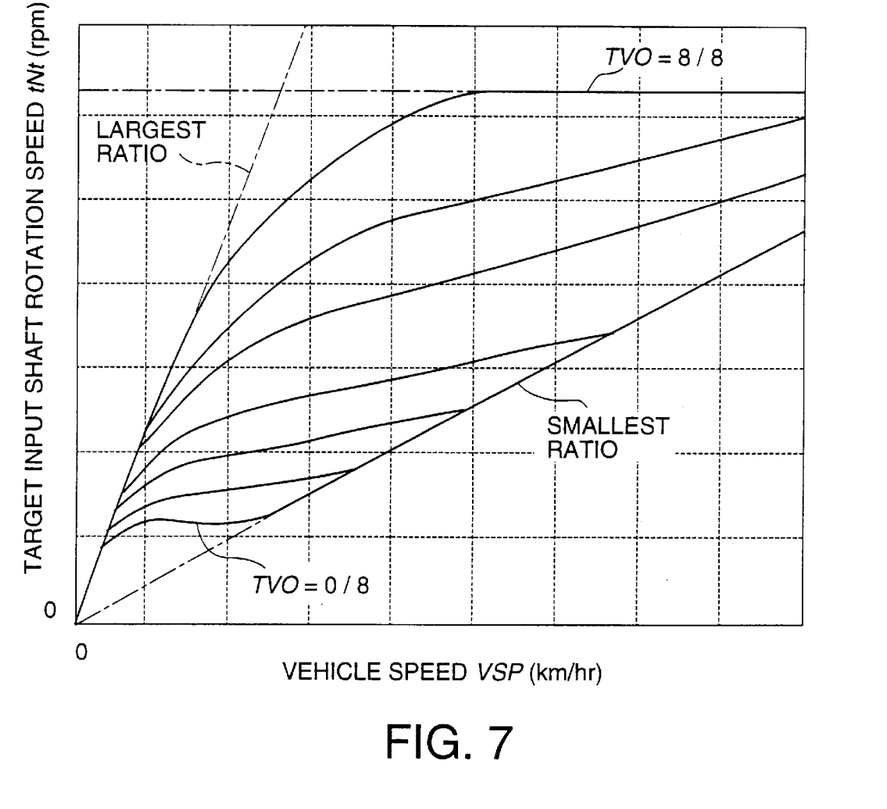
FIG. 7 is a diagram showing the speed change characteristics of a CVT to which this invention is applied.

In the step S13, the CVT controller 3 calculates the target speed change ratio RTO based on the throttle opening TVO and vehicle speed VSF. For this purpose, the CVT controller 3 finds the target speed change ratio RTO according to the vehicle speed VSP and throttle opening TVO by referring to a preset speed change map shown in FIG. 7. Further, the speed change ratio command value RRTO output to the CVT 6 is calculated by applying delay processing based on the first-order delay time-constant Kr to the target speed change ratio RTO.

The speed change ratio command value RRTO is computed based on the following equation (2) from the first-order delay time-constant Kr, target speed change ratio RTO and speed change ratio on the immediately preceding occasion that control was performed.

$$RRTO=(RTO+RRTO_{old} \times Kr)/(Kr+1) \qquad (2)$$

Figure 6:
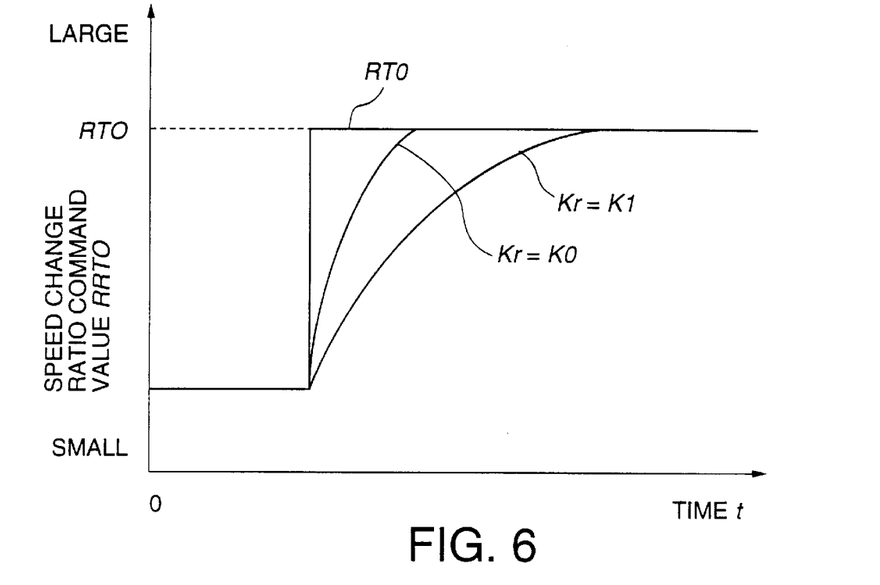
FIG. 6 is a diagram describing a relation between a first-order delay constant Kr and a speed change ratio command value RRTO according to this invention.

The relation of the target speed change ratio RTO and speed change ratio command value RRTO in the above equation is shown in FIG. 6. Specifically, the speed change ratio command value RRTO is made to gradually vary toward the target speed change ratio RTO at a rate according to the first-order delay time-constant Kr. FIG. 6 shows the case of variation from a small speed change ratio to a large speed change ratio, i.e. from high speed to low speed. Also in the converse case, the speed change ratio command value RRTO gradually varies towards the target speed change ratio RTO according to the first-order delay time-constant Kr.

In a step S14, the CVT controller 3 controls the CVT 6 according to the speed change ratio command value RRTO.

Due to the processing of the aforementioned steps S1–S14 which is performed at a predetermined interval, when the drive wheel RR or RL slips and the drive wheel speed Vwr exceeds the threshold value Vws in the high rotation speed region of the engine, the first-order delay time-constant Kr used for speed change control is fixed to a maximum value of K1 as in the case of normal running as shown in FIG. 3. At that time, the maximum value of fuel cut amount Fc is set to its largest value, Fc2. As a result, as shown in FIG. 5C, fuel cut is performed for a large number of cylinders when the engine rotation speed is high and engine output largely drops, but the CVT 6 causes the speed change ratio to vary gently with time t as shown in FIG. 5B. Therefore, the speed change ratio does not cause hunting even if the engine output rapidly varies.

In the low rotation speed of the region of the engine, the first-order delay time-constant Kr used with speed change control is set to a small value less than the time-constant K1 during normal running or when the engine rotation speed is high as shown in FIG. 3. As a result, the response of the CVT 6 when a slip occurred in the low rotation speed region increases compared to the case when a slip occurs in the high rotation speed region or during normal running, and the speed change ratio command value varies rapidly following the drop in engine output. At that time, the maximum value of the fuel cut amount Fc is set to the value Fc1 which is smaller than Fc2 in the high speed rotation region, so the engine output drop is not so much as in the high speed rotation region.

Therefore, when the engine rotation speed is low and the drive wheels begin to slip at a time to as shown in FIG. 4A, fuel cut is performed in fewer cylinders than for the high rotation speed region as shown in FIG. 4C. The engine output decreases moderately, but the speed change response of the CVT 6 is relatively higher than the response in the high rotation speed region. Due to the slip of the drive wheels RR, RL, the vehicle speed VSP increases as discussed earlier. As a result, the target speed change ratio RTO decreases as can be seen from the map of FIG. 7. As speed change is performed rapidly, the torque transmitted to the drive wheels decreases rapidly although the decrease of engine output is gentle. This causes the slip to converge in a short period. It should be noted, however, that the response of the CVT 6 is still slower than the prior art device even in this low rotation speed region, and this device therefore has an advantage over the prior art device in the suppression of hunting in this low rotation speed region.

Due to the above control, drive force control of a vehicle equipped with the CVT 6 is always performed smoothly regardless of the rotation state of the engine 4. Also, in an engine having few cylinders, the output of the engine 4 varies excessively due to fuel cut in the low rotation speed region. However, by relatively increasing the response of the CVT 6 at the same time as the output of the engine 4 is decreased in the low rotation speed region, the speed change ratio responds rapidly to output variations of the engine 4, the torque transmitted to the drive wheels promptly decreases and slip is thereby suppressed.

Figure 8:
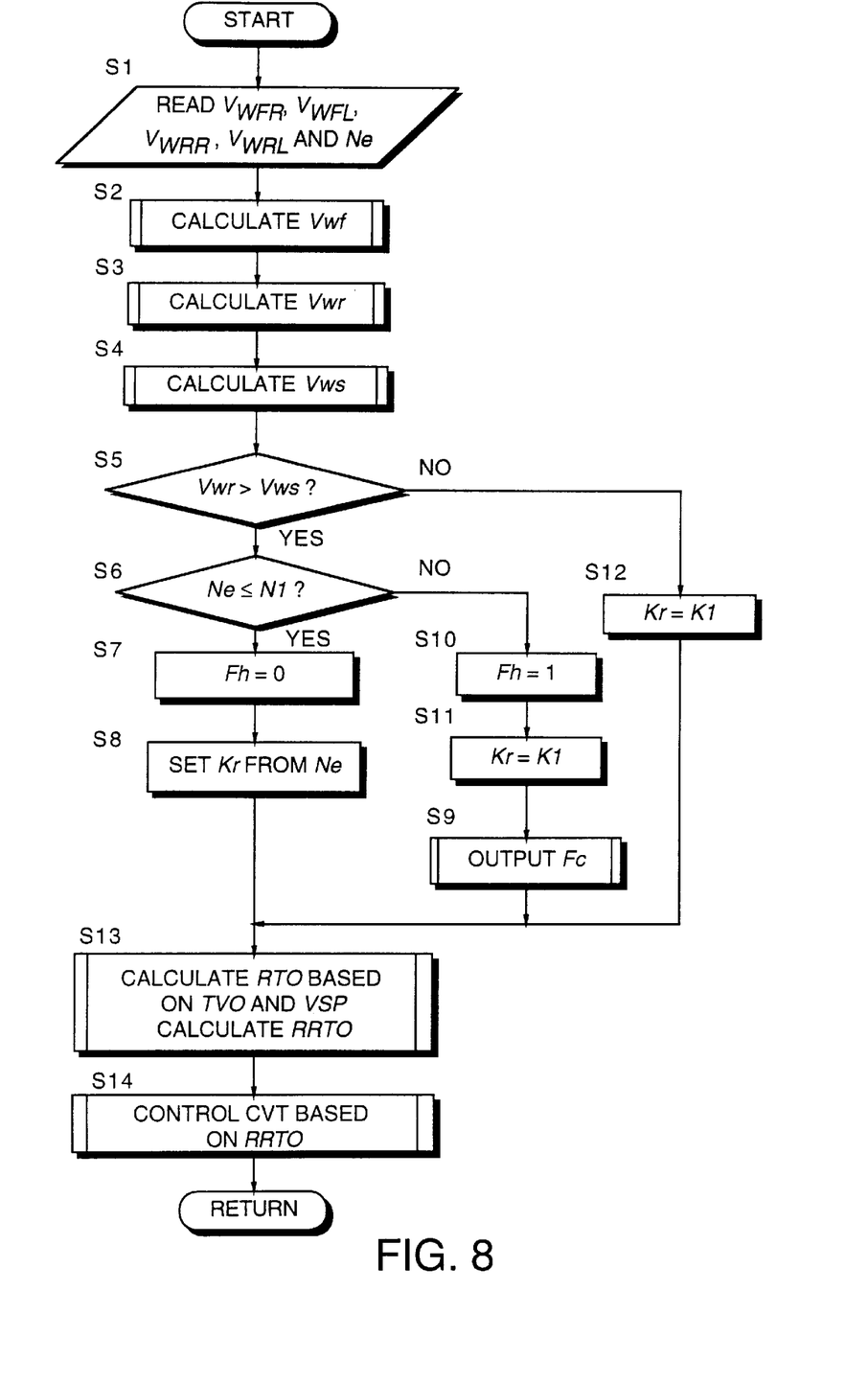
FIG. 8 is similar to FIG. 2, but showing a second embodiment of this invention.

FIG. 8 shows a second embodiment of this invention.

In this embodiment, the fuel cut processing in step S9 of the aforesaid first embodiment is performed only in the high rotation speed region of the engine 4. The remaining features of the construction are similar to those of the aforesaid first embodiment.

According to this embodiment, when a slip of the drive wheels RR, RL is detected, the routine proceeds to the step S9 and fuel cut is performed only in the high rotation speed region when the engine rotation speed Ne exceeds the predetermined value N1 in the step S6.

When a slip of the drive wheels RR, RL is detected in the low rotation speed region when the engine rotation speed Ne is less than or equal to the predetermined value N1, the time-constant Kr of the CVT 6 is set small without performing fuel cut. In other words, decreasing of the torque transmitted to the drive wheels RR, RL is performed only by rapidly decreasing the speed change ratio of the CVT 6.

By not performing fuel cut in the low rotation speed region, a large drop of engine output due to fuel cut in the low rotation speed region can be prevented, and this is especially true in an engine having a small number of cylinders.

A third embodiment of this invention will now be described referring to FIG. 9.

According to this embodiment, steps S26–S29 are provided instead of the steps S6–S8 and steps S10–S12 of the aforesaid first embodiment. The step S26 is performed by the TCS controller 1, and the steps S27–S29 are performed by the CVT controller 3.

In the aforesaid first embodiment, delay processing was applied to the speed change ratio command value RRTO according to the rotation speed Ne of the engine 4. This is in order that decrease of drive force due to fuel cut in the high rotation speed region of the engine 4 does not cause hunting of the speed change ratio, and is also to rapidly decrease transmitted torque to the drive wheels RR, RL in the low engine rotation speed region.

In this third embodiment, delay processing is applied to the vehicle speed VSP according to a slip state during acceleration of the drive wheels RR, RL.

When it is determined in the step S5 that the drive wheels RR, RL are slipping, the routine proceeds to the step S26.

Figure 13A:
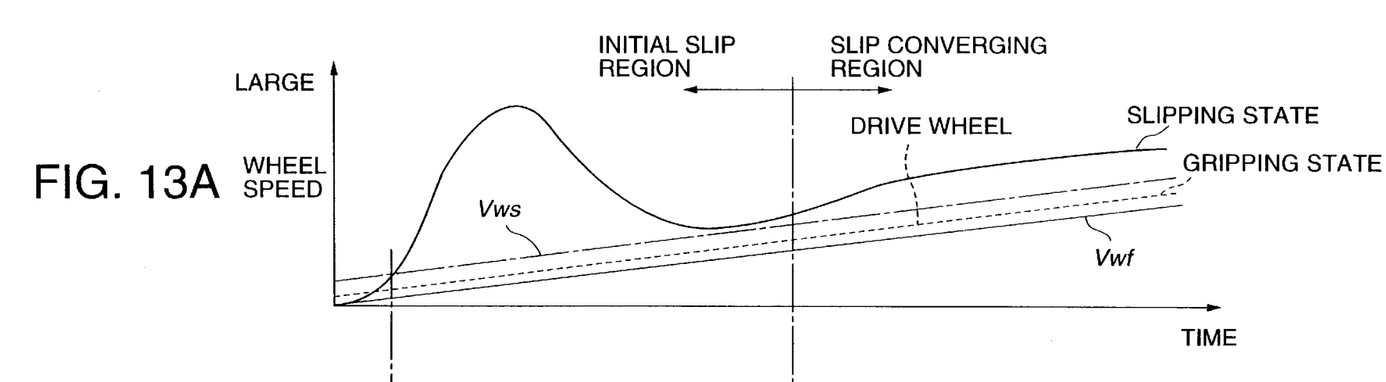
FIGS. 13A and 13B are timing charts describing a slip state of the drive wheel of a vehicle.
Figure 13B:
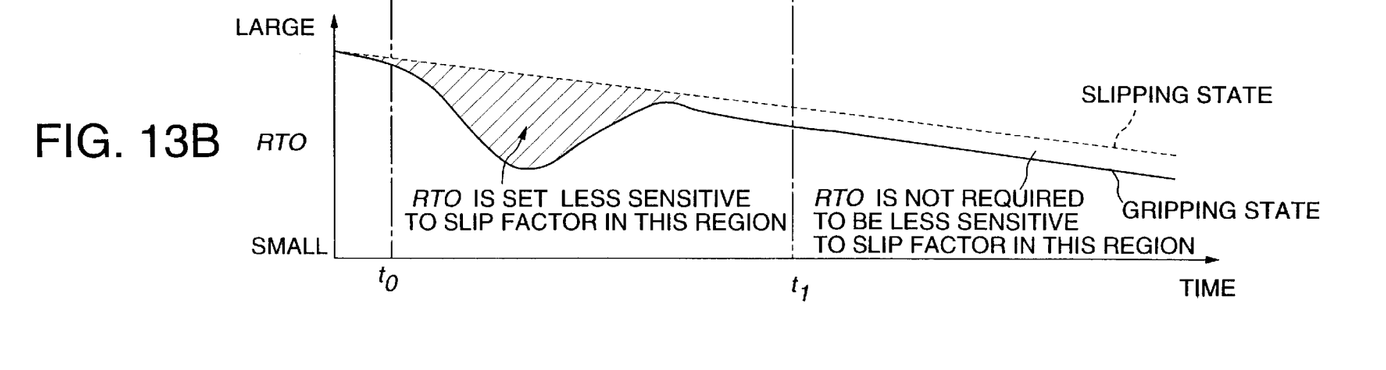

In the step S26, a determination of slip state is performed. This determines whether the current slip state is an initial slip state or a slip convergence state, as shown in FIGS. 13A and 13B. When an acceleration slip factor S expressed by the following equation is greater than a predetermined value S1, it is determined that the slip state is the initial slip state, and when the slip factor S is equal to or less than the predetermined value S1, it is determined that the slip state is a slip convergence state.

$$S = Vwr/Vwf$$

When it is determined in the step S26 that the slip state is the initial slip state, the routine proceeds to the step S27.

In the step S27 the controller 3 calculates a virtual vehicle speed VSP* whereby first-order delay filtering is applied to the vehicle speed VSP detected by the vehicle speed sensor 5. According to the aforesaid first embodiment, the speed change ratio command value RRTO was determined by applying delay processing to the target speed change ratio RTO, but according to this embodiment, delay processing is applied to the vehicle speed VSP. As a result, the response of the CVT 6 is slower when the slip is in the initial state than when it is in the convergence state in which the response of the CVT 6 is normal, i.e., without delay processing.

On the other hand when it is determined in the step S26 that the slip state is the slip convergence state, the CVT controller 26 sets the virtual vehicle speed VSP* to the vehicle speed VSP in the step S28.

After setting the virtual vehicle speed VSP* in the step S27 or S28, the process proceeds to the step S9. Here, the TCS controller 1 outputs the fuel cut signal Fc according to the slip factor S to the engine controller 2.

When it is decided in the step S5 that the drive wheels RR, RL are not slipping, the CVT controller 3 sets the virtual vehicle speed VSP* to the vehicle speed VSP in the step S29, and the routine proceeds to the step S13 without performing fuel cut.

In the step S13, the CVT controller 3 calculates the target speed change ratio RTO based on the throttle opening TVO and virtual vehicle speed VSP*. The calculated target speed change ratio RTO is then output as the speed change ratio command value to the CVT 6 in the step S14.

According to this embodiment, by applying delay processing to the vehicle speed VSP, hunting of the speed change ratio in the initial slip state is suppressed while maintaining the response of the CVT 6 in the other state. As a method of determining slip state performed in the step S26, instead of comparing the acceleration slip factor S and the predetermined value S1, it may be determined whether or not a predetermined time has elapsed since slip of the drive wheels RR, RL was detected. The period until this predetermined time has elapsed is then regarded as the initial slip state, and the period after the predetermined time has elapsed is regarded as the slip convergence state.

Figure 10:
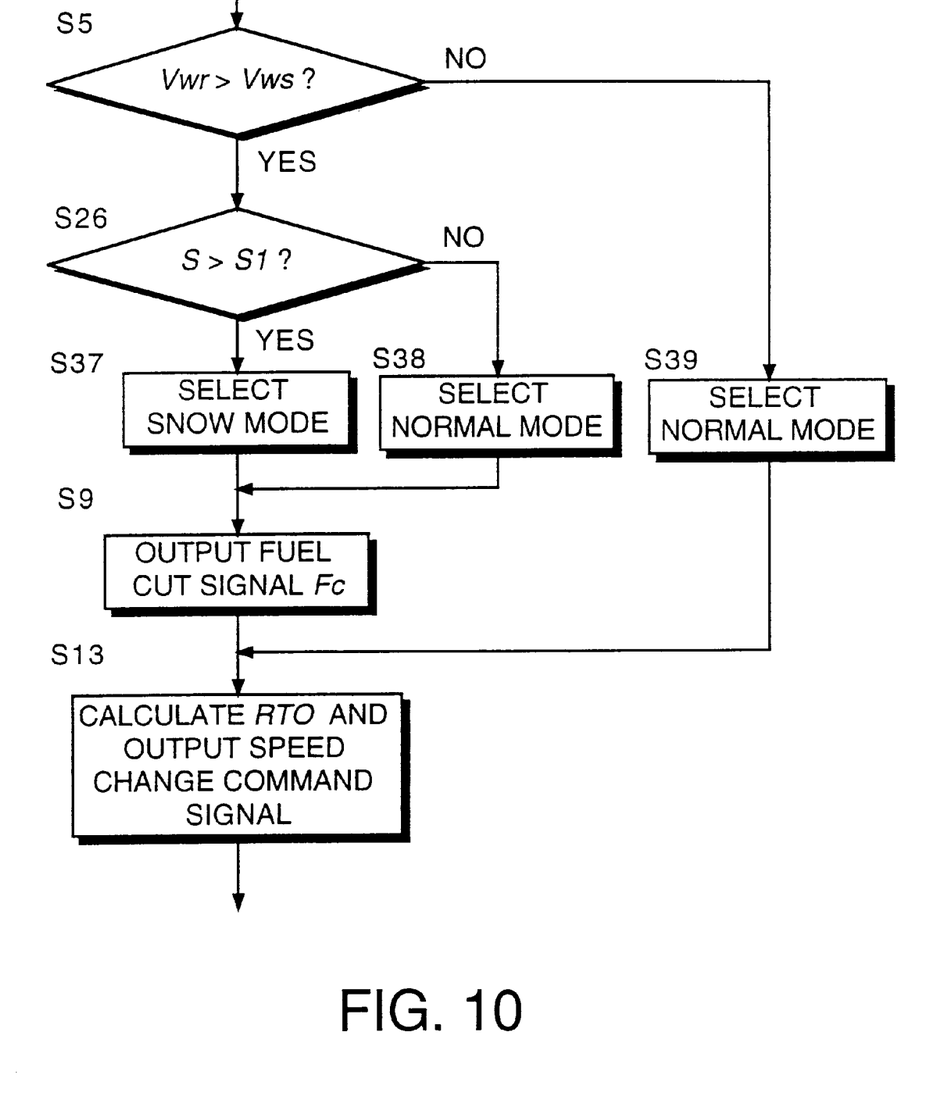
FIG. 10 is a flowchart for describing an essential part of the drive force control process according to a fourth embodiment of this invention.
Figure 11:
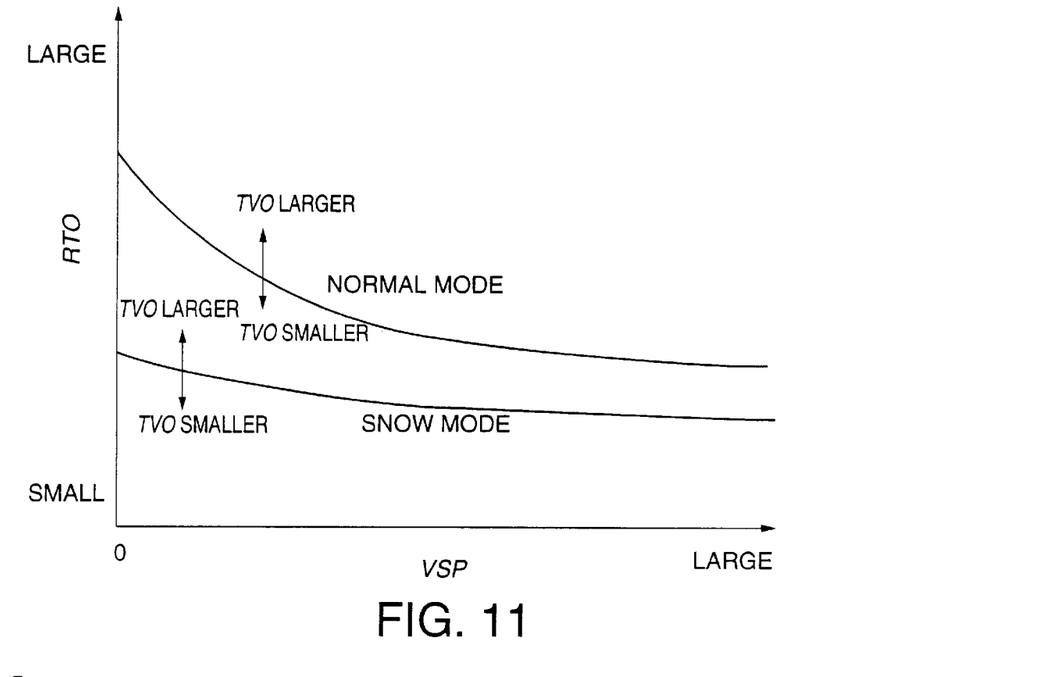
FIG. 11 is a diagram showing the contents of a map of a target speed change ratio RTO stored by the controller according to the fourth embodiment of this invention.

FIGS. 10 and 11 show a fourth embodiment of this invention.

In this embodiment, instead of the filter processing of the vehicle speed VSP of the aforesaid third embodiment, a map for calculating the target speed change ratio RTO is changed over. This map is prestored in the CVT controller 3, and it comprises a "Normal" mode for normal running and a "Snow" mode which is applied on roads under snow as shown in FIG. 11. In the "Snow" mode, a smaller target speed change ratio is set than in the "Normal" mode for the same vehicle speed VSP.

Figure 9:
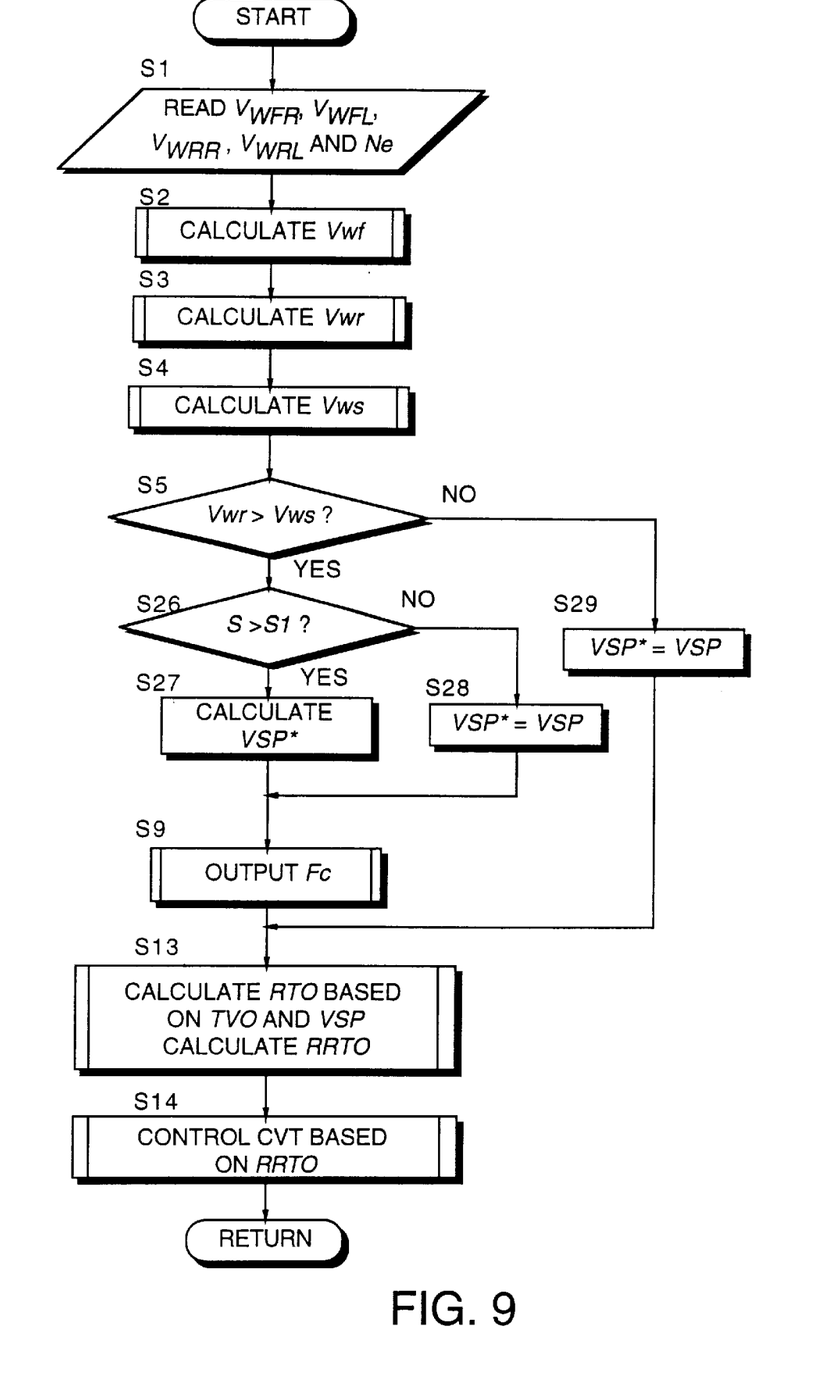
FIG. 9 is a flowchart for describing a drive force control process according to a third embodiment of this invention.

Therefore, the steps S37–S39 shown in FIG. 10 are provided instead of the steps S27–S29 of the flowchart of FIG. 9.

When it is determined in the step S26 that the slip state is the initial slip state, i.e., S>S1, the map for calculating the target speed change ratio RTO in the step S37 is changed over to "Snow". Due to this, the target speed change RTO calculated in the step S13 is set smaller than in the slip convergence state or when the drive wheels RR, RL are not slipping, and as a result, there is little change of the speed change ratio due to fuel cut.

When the slip of the drive wheels RR, RL enters the slip convergence state, i.e., S≦S1, the target speed change ratio is changed over to "Normal" mode in a step S38, and a return is made to normal speed change control. Also when slip is not detected in the step S5, the target speed change ratio is set to "Normal" mode in a step S39. The same effect as that of the aforesaid third embodiment is therefore obtained.

Figure 12:
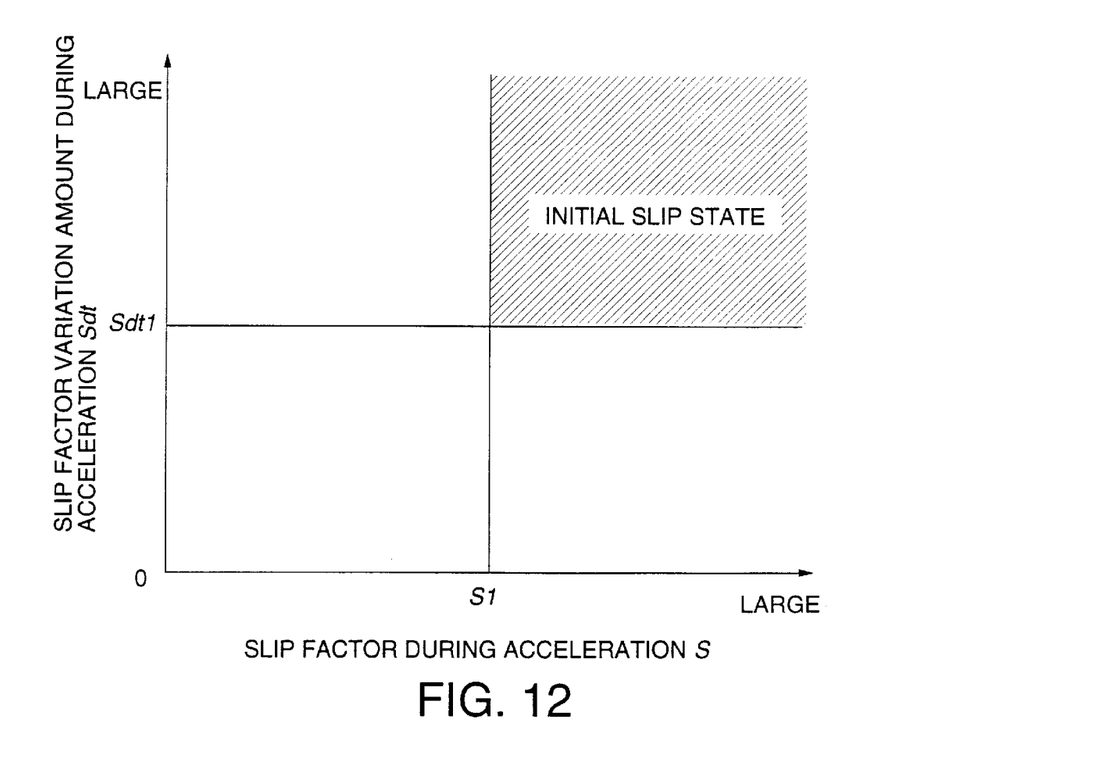
FIG. 12 is a diagram showing the contents of a map stored by the controller for determining an initial slip state according to a fifth embodiment of this invention.

FIG. 12 shows a fifth embodiment of this invention.

This embodiment relates to the determination of slip state performed in the step S26 of the aforesaid fourth embodiment. In the step S26, instead of comparing the acceleration slip factor S with the predetermined value S1, the slip state is determined by a slip factor variation amount Std which is the differential of the acceleration slip factor S. For this purpose, a map shown in FIG. 12 is prestored in the TCS controller 1. In the step S6, when it is determined that the acceleration slip factor S is greater than the predetermined value S1 and the slip factor variation amount Std is greater than a predetermined value Std1, it is determined that the vehicle is in the initial slip state.

In this way, the initial slip state in which hunting of the speed change ratio easily occurs can be detected with higher precision.

The corresponding structures, materials, acts, and equivalents of all means plus function elements in the claims below are intended to include any structure, material, or acts for performing the functions in combination with other claimed elements as specifically claimed. The embodiments of this invention in which an exclusive property or privilege is claimed are defined as follows:

What is claimed is:

1. A vehicle drive force controller for suppressing a slip of a drive wheel of a vehicle driven by a multi-cylinder engine, via a continuously variable transmission, comprising:

a first sensor for detecting a slip of said drive wheel;

a drive force reducing mechanism for reducing a drive force of said drive wheel;

a second sensor for detecting a running state of said engine; and a microprocessor programmed to:
  calculate a target speed change ratio according to said running state;
  output, to said transmission, a speed change ratio command signal to control a speed change ratio of said transmission to the target speed change ratio;
  control said drive force reducing mechanism so as to further reduce the drive force of the drive wheel when the slip of said drive wheel was detected, when said engine load is larger than a predetermined load than when said engine load is equal to or less than said predetermined load;

set said command signal such that a response of said transmission is delayed with respect to a variation of said running state, the set step being performed when the slip of said drive wheel is detected; and modify said command signal such that the response of said transmission when said engine load is equal to or less than said predetermined load, is higher than when said engine load is larger than said predetermined load, the modify step being performed when the slip of said drive wheel is detected.

2. A vehicle drive force controller as defined in claim 1, wherein said microprocessor is further programmed to control said drive force reducing mechanism so as to further reduce the drive force by decreasing an output of said engine.

3. A vehicle drive force controller as defined in claim 1, wherein said load detecting sensor detects a rotation speed of said engine when said slip of said drive wheel has been detected.

4. A vehicle drive force controller as defined in claim 1, wherein said microprocessor is further programmed to prevent said drive force reducing mechanism from reducing the drive force when said engine load is equal to or less than said predetermined load.

5. A vehicle drive force controller as defined in claim 1, wherein said drive force reducing mechanism comprises fuel injection valves respectively injecting fuel to cylinders of said engine, and said microprocessor is further programmed to control said drive force reducing mechanism so as to reduce the drive force by stopping fuel injection by one of said fuel injection valves.

6. A vehicle drive force controller for suppressing a slip of a drive wheel of a vehicle driven by a multi-cylinder engine via a continuously variable transmission, comprising:

a first sensor for detecting a slip of said drive wheel, a drive force reducing mechanism for reducing a drive force of said drive wheel, a second sensor for detecting a running state of said vehicle, a third sensor for detecting a rotation speed of said engine, and a microprocessor programmed to:
  calculate a target speed change ratio according to said running state,
  output to said transmission, a speed change ratio command signal to control a speed change ratio of said transmission to the target speed change ratio,
  control said drive force reducing mechanism so as to reduce the drive force of drive wheel when the slip of said drive wheel was detected,
  set said command signal such that a response of said transmission is delayed with respect to a variation of said running state,
  determine whether or not a rotation speed of said engine is equal to or less than a predetermined value, and
  modify said command signal such that the response of said transmission when said rotation speed is equal to or less than said predetermined value, is higher than when said rotation speed is larger than said predetermined value.

7. A vehicle drive force controller as defined in claim 6, wherein said drive force reducing mechanism comprises fuel injection valves respectively injecting fuel to cylinders of said engine, and said microprocessor is further programmed to stop fuel injection by one of said fuel injection valves when the slip of said drive wheel is detected.

8. A vehicle drive force controller as defined in claim 6, wherein said microprocessor is further programmed to determine said target speed change ratio based on the running state of said vehicle, calculate said speed change ratio command value such that said speed change ratio of said transmission follows said target speed change ratio with a predetermined time-constant, and increase the response of said transmission by reducing said time-constant when the rotation speed of said engine is equal to or less than said predetermined value.

9. A vehicle drive force controller as defined in claim 8, wherein said microprocessor is further programmed to set said time-constant when the rotation speed of said engine exceeds said predetermined value, equal to the time-constant when the slip of said drive wheel is not detected.

10. A vehicle drive force controller as defined in claim 8, wherein said microprocessor is further programmed to set a maximum number of fuel injection valves to be prevented from injecting fuel when the rotation speed of said engine exceeds said predetermined value, to be larger than the maximum number of fuel injection valves to be prevented from injecting fuel when the rotation speed of said engine is equal to or less than said predetermined value.

11. A vehicle drive force controller as defined in claim 10, wherein said microprocessor is further programmed to control said fuel injection valves such that a predetermined number of said fuel injection valves is not prevented from injecting fuel when the rotation speed of said engine is equal to or less than a predetermined value.

12. A vehicle drive force controller for suppressing a slip of a drive wheel of a vehicle driven by a multi-cylinder engine via a continuously variable transmission, comprising:

a first sensor for detecting a slip of said drive wheel, a drive force reducing mechanism for reducing a drive force of said drive wheel, a second sensor for detecting a running state of said vehicle, and a microprocessor programmed to:
  calculate a target speed change ratio according to said running state,
  output to said transmission, a speed change ratio command signal to control a speed change ratio of said transmission to the target speed change ratio,
  control said drive force reducing mechanism so as to reduce the drive force of the drive wheel when the slip of said drive wheel is detected,
  determine whether or not a predetermined time has elapsed since the slip of said drive wheel was detected, and
  modify said command signal such that a response of said transmission is delayed with respect to a variation of said running state until said predetermined time has elapsed.

13. A vehicle drive force controller as defined in claim 12, wherein said drive force reducing mechanism comprises fuel injection valves respectively injecting fuel to cylinders of said engine, and said microprocessor is further programmed to stop fuel injection by one of said fuel injection valves when the slip of said drive wheel was detected.

14. A vehicle drive force controller as defined in claim 12, wherein said microprocessor is further programmed to set a virtual vehicle speed which follows said vehicle speed with a first order delay based on a predetermined time constant, and modify said command signal by calculating said target speed change ratio based on said virtual vehicle speed.

15. A vehicle drive force controller as defined in claim 12, wherein said microprocessor comprises plural different maps for calculating said target speed change ratio according to said vehicle speed, and is further programmed to modify said command signal by applying different maps depending on whether or not said predetermined time has elapsed.

16. A vehicle drive force controller as defined in claim 12, wherein said drive wheel slip detecting sensor comprises a sensor for detecting a rotation speed of a drive wheel and a sensor for detecting a rotation speed of a driven wheel, and said microprocessor is further programmed to calculate a slip factor of said drive wheel, from a ratio of the rotation speed of said drive wheel and said driven wheel, and determine that said predetermined time has not elapsed from when the slip of said drive wheel was detected when the slip factor is greater than a predetermined factor.

17. A vehicle drive force controller as defined in claim 16, wherein said microprocessor is further programmed to calculate a variation amount of the slip factor of said drive wheel, and determine that said predetermined time has not elapsed from when the slip of said drive wheel was detected when said slip factor is greater than said predetermined factor and said variation amount is greater than a predetermined amount.

18. A vehicle drive force controller for suppressing a slip of a drive wheel of a vehicle driven by a multi-cylinder engine via a continuously variable transmission, comprising:

mean for detecting a slip of said drive wheel, means for reducing a drive force of said drive wheel, means for detecting a running state of said vehicle, means for detecting a load of said engine, means for calculating a target speed change ratio according to said running state, means for outputting to said transmission, a speed change ratio command signal to control a speed change ratio of said transmission to the target speed change ratio, means for controlling said drive force reducing mechanism so as to reduce the drive force of the drive wheel when the slip of said drive wheel was detected, means for controlling said drive force reducing mechanism so as to further reduce the drive force of the drive wheel when the slip of said drive wheel was detected, when said engine load is larger than a predetermined load than when said engine load is equal to or less than said predetermined load, and means for modifying said speed change ratio command signal so as to reduce a torque transmitted by said transmission is reduced when said engine load is equal to or less than said predetermined load than when said engine load is larger than said predetermined value.

19. A vehicle drive force controller for suppressing a slip of a drive wheel of a vehicle driven by a multi-cylinder engine via a continuously variable transmission, comprising:

means for detecting a slip of said drive wheel, means for reducing a drive force of said drive wheel, means for detecting a running state of said vehicle, means for detecting a rotation speed of said engine, means for calculating a target speed change ratio according to said running state, means for outputting to said transmission, a speed change ratio command signal to control a speed change ratio of said transmission to the target speed change ratio, means for controlling said drive force reducing means so as to reduce the drive force of the drive wheel when the slip of said drive wheel was detected, means for setting said command signal such that a response of said transmission is delayed with respect to a variation of said running state, means for determining whether or not a rotation speed of said engine is equal to or less than a predetermined value, and means for modifying said command signal such that the response of said transmission when said rotation speed is equal to or less than said predetermined value, is higher than when said rotation speed is larger than said predetermined value.

20. A vehicle drive force controller for suppressing a slip of a drive wheel of a vehicle driven by a multi-cylinder engine via a continuously variable transmission, comprising:

means for detecting a slip of said drive wheel, means for reducing a drive force of said drive wheel, means for detecting a running state of said vehicle, means for calculating a target speed change ratio according to said running state, means for outputting to said transmission, a speed change ratio command signal to control a speed change ratio of said transmission to the target speed change ratio, means for controlling said drive force reducing means so as to reduce the drive force of the drive wheel when the slip of said drive wheel is detected, means for determining whether or not a predetermined time has elapsed since the slip of said drive wheel was detected, and means for modifying said command signal such that a response of said transmission is delayed with respect to a variation of said running state until said predetermined time has elapsed.

* * * * *